March 31, 1931.  W. F. REACH  1,798,700
SKATE WHEEL
Filed Aug. 15, 1929
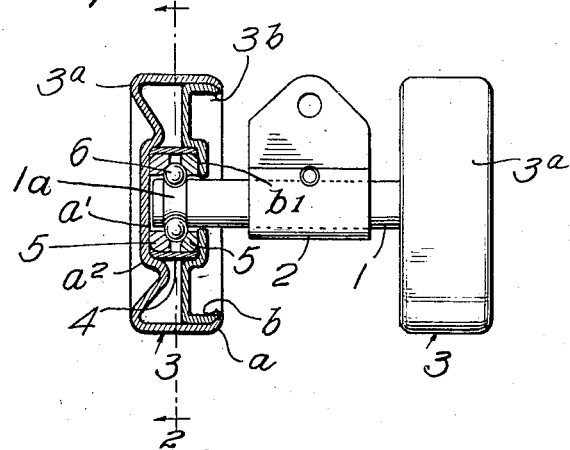
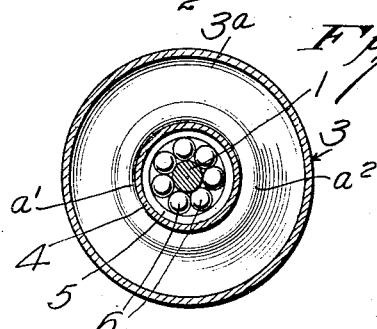
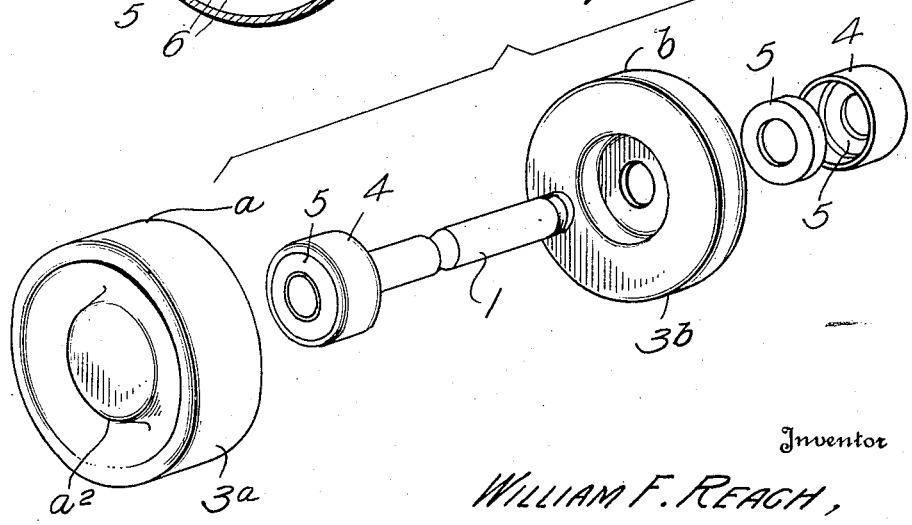
Inventor
WILLIAM F. REACH,
By Spear, Middleton, Donaldson & Hall
Attorney Patented Mar. 31, 1931

1,798,700

UNITED STATES PATENT OFFICE

WILLIAM F. REACH, OF SPRINGFIELD, MASSACHUSETTS, ASSIGNOR TO A. G. SPALDING & BROS., OF NEW YORK, N. Y., A CORPORATION OF NEW JERSEY

SKATE WHEEL

Application filed August 15, 1929. Serial No. 386,163.

My present invention relates to improvements in roller skates and the invention aims to provide a wheel and axle construction which will be strong and durable in use, but which will be simple in construction and can be manufactured and assembled in an exceedingly economical manner, and the invention comprises the novel features of construction and combination of parts hereinafter described, the nature and scope of the invention being defined by the claims appended hereto.

The invention is illustrated in the accompanying drawing, in which:

Figure 1 is a view partly in elevation and partly in section, showing the wheel axle or shaft, the bracket in which it is carried, and a pair of skate wheels thereon, and Fig. 2 is a sectional view on line 2—2 of Fig. 1.

Fig. 3 is a view of the parts detached.

Referring by reference characters to this drawing, the numeral 1 designates the wheel axle which is designed to be connected with the skate body or frame (not shown) by the bracket 2, in the usual or any desired manner. The skate wheels are indicated at 3 and each of these is composed of two sections $3a$ and $3b$ of cylindrical cup formation formed of pressed steel and designed to be telescoped one within the other with a drive fit, the member $3a$ having its peripheral flange of the width of the wheel and forming the tread surface thereof, and the member $3b$ having a peripheral flange $b$ of less width. Member or section $3a$ has its closed end or radial wall provided with a bearing receiving recess $a^1$ which is preferably formed by an annular bead or inward annular displacement of said wall as indicated at $a^2$.

The member or section $3b$ is provided with a similar bearing receiving recess $b^1$ opposed to the recess $a^1$ and which is likewise formed by the stamping or dieing operation by which the sheet metal is brought to the desired shape, this flanged and recessed construction of both disks forming an exceedingly strong and rigid wheel and enabling the use of relatively light gage sheet steel.

Member $3b$ has an axial aperture for the passage of the axle 1 as shown.

A ball race carrying member 4 has its ends seated within the aforesaid recesses with its ends abutting the bottom walls thereof, and this ball race member is in the shape of a cylinder which receives two opposed ball race members 5 between which are arranged in annular series, the anti-friction balls 6 which travel in the rotation of the wheel, between said ball race members and an annular groove $1a$ in the axle 1. In the course of manufacture, one end edge of the sleeve or cylinder is turned or spun inwardly to form an abutment against which the corresponding ball race member rests when pressed therein preferably with a friction or drive fit.

The balls and axle end are then inserted and the other ball race member pressed into place and the corresponding edge of the sleeve 4 upset or spun over to retain the adjacent ball race member in position, thereby locking the wheel permanently but rotatably on the axle.

The assembled ball race members are then seated in the recess $a^1$ of wheel member $3a$ and member $3b$ telescoped over the axle and into the open end of member $3a$, whereupon the free edge of tread flange $a$ is upset or spun down over the edge of flange $b$ of member $3b$, thus locking the two flanges together and clamping the ball race firmly in the recesses of the wheel members.

Having thus described my invention, what I claim is:

1. In a roller skate a wheel comprising inner and outer web sections having cylindrical flanges telescopically fitted one within the other, said web portions having opposed bearing receiving recesses, and the inner of said web portions having an axial opening, an axle extending into said opening and having a single annular groove, a pair of ball race members located within said recesses, an annular series of balls between said annular groove and said ball race members, a sleeve encircling said ball race members and having its end edges inturned over the outer edges of said ball race members, the walls of the portions of the webs defining such recesses overlying the outer ends of the sleeve and outer faces of the ball race members.

2. A roller skate construction according to claim 1 in which the cylindrical flanges from the webs extend therefrom in the same direction, one of the flanges being of approximately half the width of the other, and the free edge of the outer flange being inturned over the free edge of the inner flange.

3. A roller skate construction according to claim 1 in which the outer web portion is continuous over the end of the axle.

In testimony whereof, I affix my signature.

WILLIAM F. REACH.